(12) United States Patent
Rabizo

(10) Patent No.: US 11,878,860 B2
(45) Date of Patent: Jan. 23, 2024

(54) THERMAL LINER FOR TRANSPORTING GOODS

(71) Applicant: Ivan Georgievich Rabizo, Kharkov (UA)

(72) Inventor: Ivan Georgievich Rabizo, Kharkov (UA)

(*) Notice: Subject to any disclaimer, the term of this patent is extended or adjusted under 35 U.S.C. 154(b) by 0 days.

(21) Appl. No.: 16/329,533

(22) PCT Filed: Nov. 20, 2017

(86) PCT No.: PCT/UA2017/000114
§ 371 (c)(1),
(2) Date: Apr. 4, 2019

(87) PCT Pub. No.: WO2019/009867
PCT Pub. Date: Jan. 10, 2019

(65) Prior Publication Data
US 2020/0198887 A1   Jun. 25, 2020

(30) Foreign Application Priority Data

Jul. 6, 2017   (UA) .................. 2017 07126

(51) Int. Cl.
*B65D 90/04*   (2006.01)
*B65D 65/40*   (2006.01)
*F16L 59/02*   (2006.01)

(52) U.S. Cl.
CPC ........... *B65D 90/046* (2013.01); *B65D 65/40* (2013.01); *F16L 59/029* (2013.01)

(58) Field of Classification Search
CPC .... B65D 90/048; B65D 90/046; B65D 90/04; B65D 25/16; B65D 25/14; B65D 81/3816;

(Continued)

(56) References Cited

U.S. PATENT DOCUMENTS 3,369,959 A * 2/1968 Noyes ................. C08L 2666/36
428/421
3,410,443 A * 11/1968 Hofmann ................ F16L 59/14
220/592.21

(Continued)

FOREIGN PATENT DOCUMENTS

CA   2305604 A1 * 1/2001  ............ F16L 59/029
CA   2850267 A1 * 5/2013  ............ B65D 85/72

(Continued)

OTHER PUBLICATIONS

Translation of Written Opinion of PCT/UA2017/000114, dated May 17, 2018, pp. 3-5 (Year: 2018).*

(Continued)

*Primary Examiner* — Robert J Hicks
(74) *Attorney, Agent, or Firm* — NEXUS LAW PLLC; Leonard Raykinstren

(57) ABSTRACT

The thermal liner relates to the field of thermal insulation for transporting goods and contains a thermal insulating material, and its components are hermetically connected. At that, the liner repeats the inner shapes of the container; it has a front wall that opens, and its fastening elements are made along the upper perimeter with the possibility of fixing the liner in the container using a mounting cord and the inner lugs of the metal container. The thermal liner is made of a set of materials, and laminated metallized polyethylene foam (PE foam) as the thermal insulating material and a black polyethylene film, which provides the desired temperature difference between the external and internal temperatures and reduces the thermal conductivity of the product.

12 Claims, 1 Drawing Sheet

(58) Field of Classification Search
CPC .... B65D 81/3813; B65D 81/38; B65D 65/40; B65D 65/38; F16L 59/029; F16L 59/02
USPC ............ 220/592.25, 592.21, 592.2, 1.6, 1.5; 428/613, 36.5, 71, 158
See application file for complete search history.

(56) References Cited

U.S. PATENT DOCUMENTS

| | | | | |
|---|---|---|---|---|
| 3,423,264 | A * | 1/1969 | Summerfelt | B65D 90/046 156/71 |
| 4,320,163 | A * | 3/1982 | Schwartz | B32B 5/20 427/256 |
| 4,541,765 | A * | 9/1985 | Moore | B65D 88/62 220/1.6 |
| 4,550,046 | A * | 10/1985 | Miller | B32B 3/12 428/116 |
| 4,557,400 | A * | 12/1985 | Clarke | B60P 1/56 105/243 |
| 4,601,405 | A * | 7/1986 | Riemer | B64D 9/00 160/368.1 |
| 4,710,637 | A * | 12/1987 | Luckey | G01T 1/1641 250/486.1 |
| 4,830,937 | A * | 5/1989 | Clerici | H01M 50/116 429/120 |
| 4,911,317 | A * | 3/1990 | Schloesser | B65D 90/046 220/1.5 |
| 5,100,725 | A * | 3/1992 | Pearson | B32B 5/32 428/314.4 |
| 5,244,332 | A * | 9/1993 | Krein | B65D 90/047 220/1.5 |
| 5,399,408 | A * | 3/1995 | Nowara | B32B 3/26 428/73 |
| 6,913,389 | B2 | 7/2005 | Kannankeril et al. | |
| 2006/0175324 | A1* | 8/2006 | Podd | B65D 90/046 220/1.6 |
| 2014/0134370 | A1* | 5/2014 | Abhyankar | B32B 27/08 428/36.6 |

FOREIGN PATENT DOCUMENTS

| | | | |
|---|---|---|---|
| RU | 2132522 C1 | 6/1999 | |
| RU | 33958 U1 * | 11/2003 | ................ E04B 1/82 |
| RU | 33958 U1 | 11/2003 | |
| RU | 109051 U1 | 10/2011 | |
| RU | 143828 U1 | 7/2014 | |
| RU | 156718 U1 | 11/2015 | |
| RU | 163545 U1 | 7/2016 | |
| RU | 2156914 C2 | 9/2020 | |
| WO | WO-2017047748 A1 * | 3/2017 | ............ F16L 59/065 |

OTHER PUBLICATIONS

Translation of RU33958. Manankov et al., Nov. 20, 2003, Figure (Year: 2003).*

* cited by examiner

THERMAL LINER FOR TRANSPORTING GOODS

RELATED APPLICATIONS

This application claims priority to Patent cooperation Treaty application number PCT/UA2017/000114 filed 20 Nov. 2017, which claims priority to Ukrainian patent application number a 2017 07126 filed on 6 Jul. 2017, and incorporated herewith by reference in its entirely.

RELATED ART

The invention relates to the field of thermal insulation, namely to thernio-insulating products, and can be used to create liners that use material that provides resistance to external temperature, as well as capable of providing an indicator that is acceptable for transporting wine and other products to ensure thermal stability inside the liner in summer and winter.

BACKGROUND OF THE INVENTION

Perishable products are transported by road, sea, rail, and air transport using different technologies. When transporting expensive perishable goods, a controlled atmosphere, which is most suitable for the freshness retention, is usually used. By The controlled atmosphere refers to the creation, purification, and the like of a sealed or controlled atmosphere around products and usually includes the regulation of the content of at least one of the gases: nitrogen, oxygen, carbon dioxide, and ethylene.

A device for storing biological objects in vacuum and at low temperatures is known; see RF patent No. 2132522, F 25 D 3/00, in 1999. The device contains two concentrically mounted cups of a vacuum-tight material, and vacuum-powder thermal insulation is placed between them. The gap between the cups is closed from the top with a spacer ring provided with a check valve. The cover of the device has a connection pipe for connecting a vacuum. In the pipe is installed a check valve. The check valve is installed in the pipe.

A thermo-insulating product, which contains an insulating material, and its components are hermetically connected, is closest to the claimed invention on the technical essence, purpose, and the achieved result chosen as the prototype. The product also includes a covering foil, which is evacuated and hermetically welded [RF patent No. 2156914, IPC: F16L 59/06, F16L 59/02, BI No. 27, in 2000].

The disadvantage of the product is a relatively high coefficient of thermal conductivity. In addition, during operation, it is impossible to periodically monitor its value.

SUMMARY IF THE INVENTION

The basis of the invention is the object of reducing the thermal conductivity of the product.

The problem is solved in that the thermal liner contains a thermal insulating material, and its components are hermetically connected. In accordance with the invention, the liner repeats the inner shapes of the container; it has a front wall that opens, and its fastening elements are made along the upper perimeter with the possibility of fixing the liner in the container using a mounting cord and the inner lugs of the metal container. The thermal liner is made of a set of materials, and laminated metallized polyethylene foam (PE foam) with light-reflecting and heat-shielding ability as the thermal insulating material and a black polyethylene film with the possibility of avoiding ultraviolet rays through the liner are used.

In accordance with another form of the invention, the thickness of the polyethylene foam ranges from 2 mm to 10 mm.

In accordance with another form of the invention, the eyelets are used as fastening elements.

In accordance with another form of the invention, the polyethylene foam can have unilateral and bilateral lamination.

In accordance with another form of the invention, the bubble film is used as a thermal insulating material.

In accordance with another form of the invention, the lamination is made of metallized film or covered with a thin layer of aluminum.

In accordance with another form of the invention, the black film is the inner layer in the liner or the outer layer, or it is inside the material between the outer and inner layer.

In accordance with another form of the invention, the bottom of the liner on the inside can be protected from damage during loading with an additional layer of woven polypropylene.

In accordance with another form of the invention, hinges, ties, or hooks are used as fastening elements of the liner inside the metal container.

In accordance with another form of the invention, the appliance cord is made in the form of tape, twine.

In accordance with another form of the invention, the liner component parts can be heat sealed or stitched together.

In accordance with another form of the invention, the front wall can be opened with a zipper, as well as with a textile or polymer fastener.

The invention achieves the task of reducing the thermal conductivity of the product due to the fact that the liner repeats the inner shapes of the container; it has a front wall that opens, and the eyelets are made along the upper perimeter with the possibility of fixing the liner in the container using a mounting cord and the inner lugs of the metal container. At that, the thermal liner is made of a set of materials, and laminated metallized polyethylene foam (PE foam) with light-reflecting and heat-shielding ability as the thermal insulating material and a black polyethylene film to ensure that the cargo in a metal container does not respond to ultraviolet radiation, sunlight, so that it is isolated from the penetration of cold or hot air, and does not subjected to sudden temperature changes that occur during container transportation across different continents, as well as temperature differences day/night, are used.

After conducting tests with different materials in a thermal chamber, a complex of materials was developed that provide acceptable indicators of temperature differential, the difference of which is at least 9 degrees and above.

Due to the fact that the liner material should be provided with a light-reflecting layer, an air barrier occurs that will not allow the external temperature to penetrate with the primary indicators inside the liner, as well as a layer that does not transmit UV rays.

DETAILED DESCRIPTION OF THE INVENTION

Figure 1:
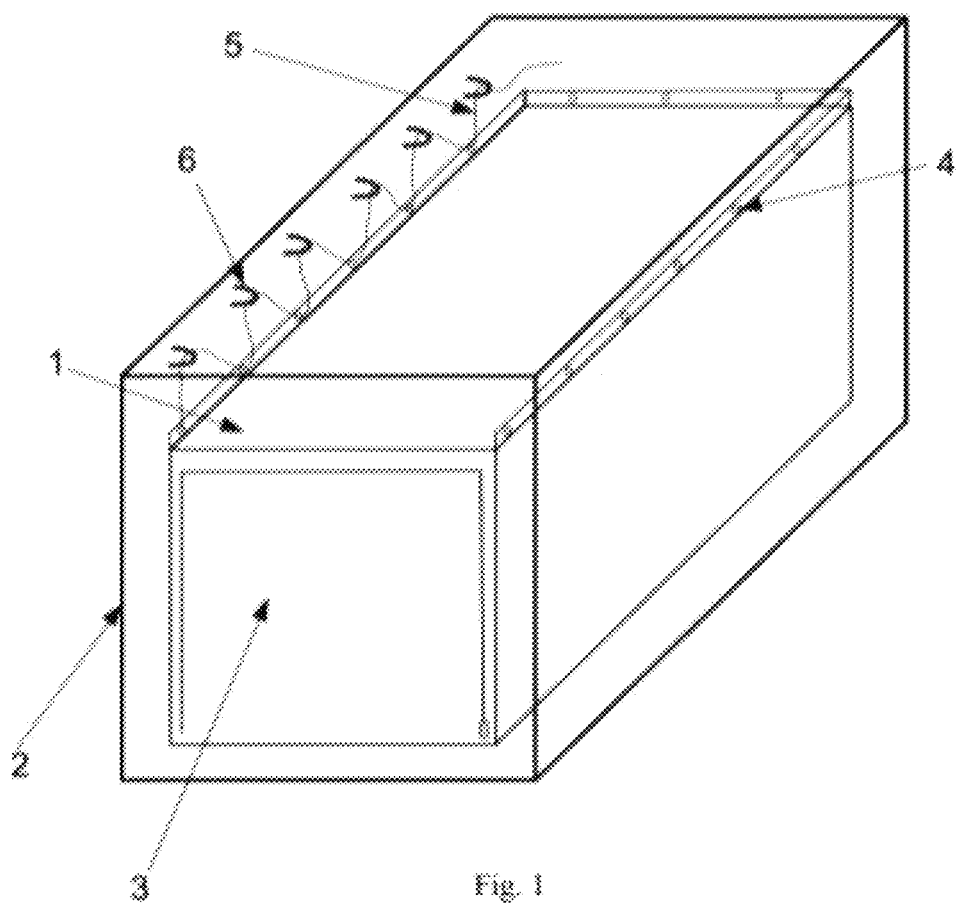
FIG. 1 shows a general view of the liner
FIG. 2—the composition of the liner material.
Figure 2:
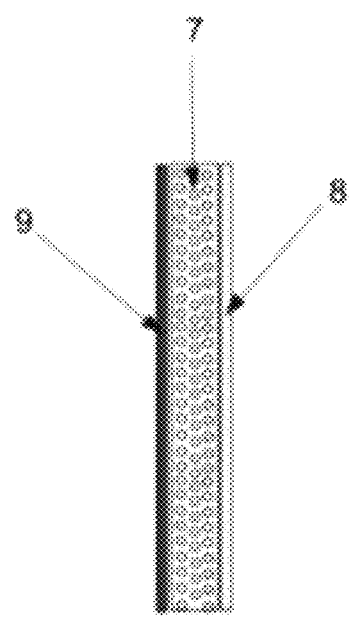

Referring now to the drawings and the illustrative embodiments depicted therein, as best shown in FIGS. 1 and 2, a thermal liner 1 is provided for safely transporting perishable products and other goods inside a transportation container 2. The thermal liner 1 comprises a laminate construction and includes a polyethylene foam (PE foam) 7 sandwiched between a light-reflective film 8 and a black polyethylene film 9. Preferably, the black film 9 is opaque, and the light-reflective film 8 additionally provides a heat-shielding function. As such, the light-reflective film 8 is contemplated to serve as a thermal insulating layer, and the black film 9 as a UV protector. The thermal liner 1 preferably repeats or follows along the inner shapes of the container 2. The thermal liner 1 has a plurality of sidewalls and a front wall 3 that can be selectively opened. Further, the thermal liner 1 has one or more eyelets 4 that are made along the upper perimeter with the possibility of fixing the liner 1 in the container 2 using a mounting cord 5 and the inner lugs 6 of the metal container 2. The set of materials from which the thermal liner 1 is made, as described above, ensures that the cargo in the metal container 2 does not respond to ultraviolet radiation, sunlight, and so that it is isolated from the penetration of cold or hot air, and is not subjected to sudden temperature changes that occur during container transportation across different continents, as well as temperature differences during the day and night.

The thermal liner is used in this way. In order to install the liner, you must unfold the liner and fix the upper part of the side walls with angular cords (tapes, twine) at the lugs (loops) of the container. After that, it is necessary to fix the lower part of the side walls of the liner with the help of angular and longitudinal cords (tapes, twine) in the lugs (loops) of the container. After fixing the angular and longitudinal tapes, you must insert the mounting cords (tapes, twine) into the lugs (loops) of the container and the grommet of the liner and fix them on the last lug (loop) of the container.

It is further contemplated that the light-reflective film 8 includes a base, such as for example a polyethylene terephthalate (PET) film, that is coated with an aluminum or light-reflecting paint. Alternatively, to provide the base of film 8 with a light-reflecting layer, a thin layer of aluminum may be applied onto the base to form a metallized film with a reflective effect and capable of providing a thermal insulation.

Polyethylene foam 7 is envisioned to serve as an air barrier with a heat-shielding function, which is intended to slow down the action of sudden heating or cooling of the temperature inside the container 2.

The black plastic film 9 serves as UV protection. Additionally, the black plastic film 9 is envisioned to provide thermostability.

As discussed above, the thermal liner 1 generally includes the polyethylene foam 7, light-reflective film 8 and black plastic film 9, with the polyethylene foam 7 being between the light-reflective film 8 and black plastic film 9. The outer layer of the thermal liner 1 is laminated on one side with the light-reflective film 8 while the black film 9 is used as an inner layer. Optionally, the black film 9 can be an outer layer and the light-reflective film 8 an inner layer. It should be appreciated, however, that the polyethylene foam 7 can have either the light-reflective film 8 or the black plastic film 9, i.e., unilateral lamination.

In order to prevent the penetration of air and the formation of condensate inside the liner during transportation, the thermal liner is produced by heat sealing of the material.

Thus, the invention provides the composition of the material for the thermal liner, which provides the desired temperature difference between the external and internal temperatures and reduces the thermal conductivity of the product.

The invention claimed is:

1. A thermal liner for transporting goods and configured to fit within a container, the thermal liner comprising:
a front wall and a plurality of sidewalls, the front wall and sidewalls each configured to extend along respective one of inner walls of the container and being hermetically connected with one another, the front wall of the thermal liner is adapted to be selectively opened, the front wall and sidewalls each is formed of a thermal insulating material comprising:
a polyethylene foam;
a light-reflective film; and
a black plastic film;
wherein the polyethylene foam is sandwiched between the light-reflective film and the black plastic film;
wherein an upper portion of at least one of the sidewalls has one or more fastening elements that can be used to secure the at least one of the sidewalls to one or more inner walls of the container by using a mounting cord and one or more lugs connected to the one or more inner walls of the container.

2. The thermal liner of claim 1, wherein the light-reflective film is a polyethylene terephthalate film coated with a layer of aluminum or light-reflecting paint.

3. The thermal liner of claim 1, wherein the light-reflective film is a polyethylene terephthalate film having a layer of aluminum applied thereon.

4. The thermal liner of claim 1, wherein the light-reflective film is a bubble film coated with a layer of aluminum, light-reflecting paint or having a layer of aluminum applied thereon.

5. The thermal liner of claim 1, wherein the black plastic film is a black polyethylene film that is opaque.

6. The thermal liner of claim 1, wherein a thickness of the polyethylene foam ranges from 2 mm to 10 mm.

7. The thermal liner of claim 1, wherein the one or more fastening elements are one or more eyelets.

8. The thermal liner of claim 1, wherein the polyethylene foam can have unilateral or bilateral lamination.

9. The thermal liner of claim 1, wherein the light-reflective film is an outer layer of the thermal liner so as to be proximal to the inner walls of the container, and the black plastic film is an inner layer of the thermal liner so as to be distal to the inner walls of the container.

10. The thermal liner of claim 1, wherein an inner surface of a bottom sidewall of the thermal liner includes a layer of woven polypropylene.

11. The thermal liner of claim 1, wherein the front wall and sidewalls are heat-sealed with one another.

12. The thermal liner of claim 1, wherein the front wall includes a zipper, a textile or a polymer fastener.

* * * * *